(12) United States Patent
Iwahashi

(10) Patent No.: US 7,609,328 B2
(45) Date of Patent: Oct. 27, 2009

(54) STATE-SETTING CHANGING APPARATUS FOR TELEVISION RECEIVER

(75) Inventor: Toshiya Iwahashi, Daito (JP)

(73) Assignee: Funai Electric Co., Ltd, Daito-shi (JP)

( * ) Notice: Subject to any disclaimer, the term of this patent is extended or adjusted under 35 U.S.C. 154(b) by 469 days.

(21) Appl. No.: 11/106,477

(22) Filed: Apr. 15, 2005

(65) Prior Publication Data

US 2005/0243209 A1 Nov. 3, 2005

(30) Foreign Application Priority Data

Apr. 15, 2004 (JP) .............................. 2004-119803

(51) Int. Cl.
*H04N 5/44* (2006.01)
(52) U.S. Cl. .................. 348/734; 348/556; 348/445
(58) Field of Classification Search ................ 348/734, 348/445, 739, 554–556, 441, 563–564, 569
See application file for complete search history.

(56) References Cited

U.S. PATENT DOCUMENTS

| | | | | |
|---|---|---|---|---|
| 5,367,316 A | * | 11/1994 | Ikezaki ........................ | 345/158 |
| 5,523,800 A | * | 6/1996 | Dudek ........................ | 348/734 |
| 5,699,123 A | * | 12/1997 | Ebihara et al. .............. | 348/445 |
| RE35,952 E | * | 11/1998 | Beery ......................... | 348/731 |
| 6,025,869 A | * | 2/2000 | Stas et al. ..................... | 725/28 |
| 6,367,078 B1 | * | 4/2002 | Lasky ........................... | 725/52 |
| 6,501,514 B1 | * | 12/2002 | Townsend et al. ........... | 348/734 |
| 6,879,351 B1 | * | 4/2005 | Brown ......................... | 348/734 |
| 6,918,136 B2 | * | 7/2005 | Shepherd .................... | 725/141 |
| 2004/0177384 A1 | * | 9/2004 | Kahn ......................... | 725/140 |

FOREIGN PATENT DOCUMENTS

| | | |
|---|---|---|
| JP | 63-208372 | 8/1988 |
| JP | 5-91435 A | 4/1993 |
| JP | 7-143419 A | 6/1995 |
| JP | 8-95536 A | 4/1996 |
| JP | 2001-25078 A | 1/2001 |

OTHER PUBLICATIONS

Notice of the reason for refusal dated Oct. 2, 2007 with an English translation of the pertinent portions (Five (5) pgaes).

* cited by examiner

*Primary Examiner*—Trang U Tran
(74) *Attorney, Agent, or Firm*—Crowell & Moring LLP

(57) ABSTRACT

A state-setting changing apparatus for a television receiver allows a user to easily change the aspect ratio of a picture displayed on the display screen or make other settings without the need for additional operation keys or dedicated keys on a remote controller and without displaying a setup screen or the like on the display screen. The remote controller includes a specific key for a user to operate at least when making a state setting change, numeric keys assigned to predetermined state settings, and an enter key for a user to confirm a command. The television receiver includes a receiving circuit for receiving signals transmitted from the remote controller, a command analyzing circuit for analyzing a command entered by a user based on contents and an order of received signals, an on-screen display circuit for displaying the number of a numeric key operated by a user on the display screen, and a state-setting changing circuit for changing a state setting based on an analysis provided by the command analyzing circuit when a user operates the enter key.

20 Claims, 4 Drawing Sheets

FIG. 3A

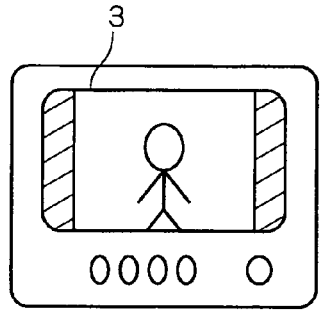

SIDEBAR DISPLAY ON 16:9 ASPECT RATIO DISPLAY SCREEN

PRESS SETUP KEY

FIG. 3B

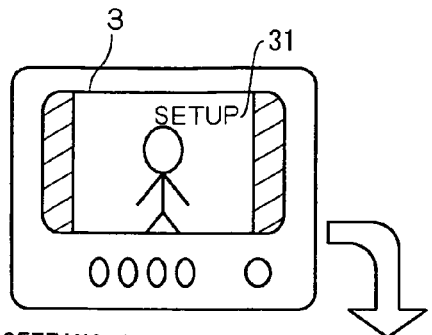

SETTING CHANGE MODE

FIG. 3D

ENTER KEY

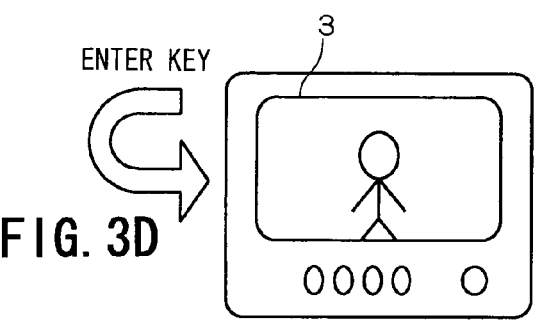

PREVIEW FULL SCREEN DISPLAY

FIG. 3C

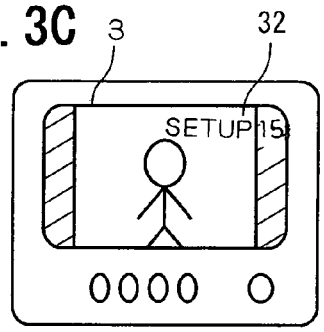

ENTER DIGITS "1" AND "5" BY NUMERIC KEYS

FIG. 4

| CODE | ASSOCIATED SETTING |
|---|---|
| 10 | CHANGE INTO LETTERBOX DISPLAY ON 4:3 ASPECT RATIO DISPLAY SCREEN |
| 11 | CHANGE INTO ZOOM DISPLAY ON 4:3 ASPECT RATIO DISPLAY SCREEN |
| 12 | CHANGE INTO FULL SCREEN DISPLAY ON 4:3 ASPECT RATIO DISPLAY SCREEN |
| 13 | CHANGE INTO SIDEBAR DISPLAY ON 16:9 ASPECT RATIO DISPLAY SCREEN |
| 14 | CHANGE INTO ZOOM DISPLAY ON 16:9 ASPECT RATIO DISPLAY SCREEN |
| 15 | CHANGE INTO FULL SCREEN DISPLAY ON 16:9 ASPECT RATIO DISPLAY SCREEN |
| 20 | SWITCH TO DAYLIGHT SAVING TIME OFF |
| 21 | SWITCH TO DAYLIGHT SAVING TIME ON |
| 30 | CHANGE LANGUAGE TO ENGLISH |
| 31 | CHANGE LANGUAGE TO SPANISH |
| 32 | CHANGE LANGUAGE TO FRENCH |

STATE-SETTING CHANGING APPARATUS FOR TELEVISION RECEIVER

BACKGROUND OF THE INVENTION

1. Field of the Invention

The present invention relates to an apparatus for changing state settings of a television receiver by means of a remote controller.

2. Description of the Related Art

Conventionally, various systems have been proposed for selecting various display modes or changing a time setting and the like in a set top box (STB) such as a television receiver. For example., there is a system in which keys on a remote controller are each assigned to enter a kind of command. Such a system can simplify operations of keys but makes the remote controller relatively large. Further, since the remote controller is limited in size, there is a limit on the number of keys that can be arranged on the remote controller. Consequently, the number of selectable modes or settings is limited. In order to allow more modes or settings to be selected or changed, such a system as disclosed in Japanese laid-open patent publication Sho 63-208372 is configured to display a setup screen or a menu on a display screen so that a user can enter a command by operating a cursor key and the like on a remote controller while looking at the screen. However, in such a remote controller, a plurality of key operations must be combined for a single command to be entered. Therefore, operations of the remote controller may be considerably cumbersome for a user.

Further, the conventional system that is configured to display a setup screen or a menu on the display screen has the following problem. While a mode selection or a setting change is carried out, a picture image to be primarily displayed on the display screen becomes behind the setup screen or the menu, so that a user cannot view a primarily desired program. This exerts a great influence especially in the case where the remote controller requires cumbersome operations, because it takes long time before a user can view a desired program.

SUMMARY OF THE INVENTION

An object of the present invention is to provide a state-setting changing apparatus for a television receiver that allows a mode selection and a setting change by relatively simple operations without increasing the number of keys on a remote controller and without displaying a setup screen or a menu on a display screen.

According to an aspect of the present invention, a state-setting changing apparatus for a television receiver is capable of changing a state setting in response to operations of keys on a remote controller by a user, wherein the remote controller includes a specific key for a user to operate at least when making a state setting change, numeric keys assigned to predetermined state settings, and an enter key for a user to confirm a command; and wherein the television receiver includes a receiving circuit for receiving signals transmitted from the remote controller, a command analyzing circuit for analyzing a command entered by a user based on contents and an order of received signals, an on-screen display circuit for displaying a number of a numeric key operated by a user on a display screen, and a state-setting changing circuit for changing a state setting based on an analysis provided by the command analyzing circuit when a user operates the enter key.

By the above configuration, a user can easily make state-setting changes such as a display mode selection, a time setting change, and the like on the television receiver by the simple operations, more particularly only by operating at least the three key, i.e., the specific key, any one of the numeric keys, and the enter key, on the remote controller. As these keys, keys provided on a common remote controller can be used without modification. Therefore, there is no need to increase the number of keys on the remote controller, and thus the remote controller can be prevented from becoming large. Further, since a setup screen or a menu is not displayed on the display screen of the television receiver, a user can continue viewing a desired program even while making state-setting changes.

BRIEF DESCRIPTION OF THE DRAWINGS

FIG. 3 illustrates how a display screen of the television receiver changes.

FIG. 4 shows an example of a list of codes and settings associated therewith in the apparatus.

DESCRIPTION OF THE PREFERRED EMBODIMENTS

Figure 1:
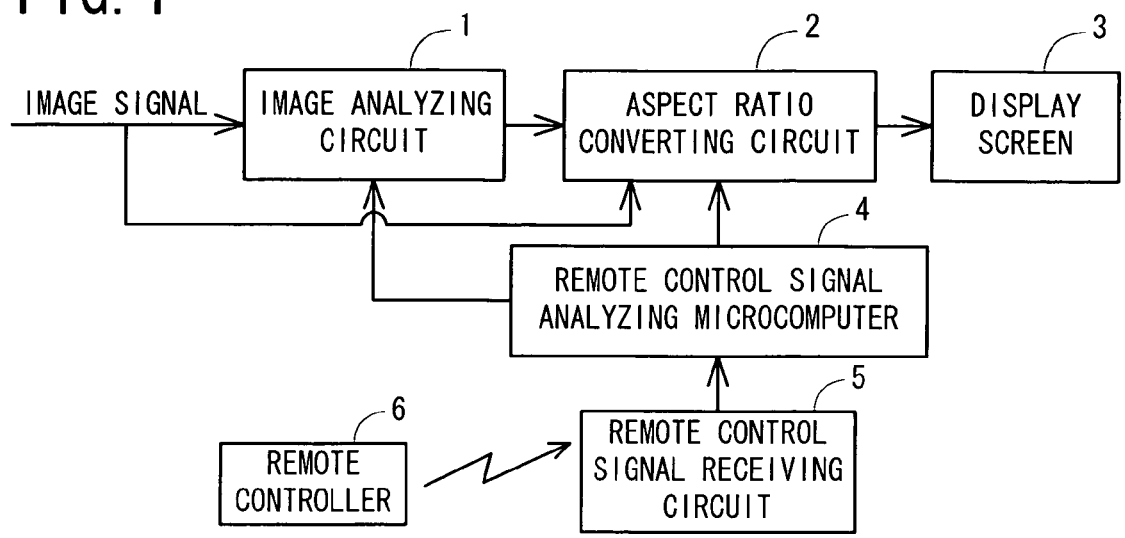
FIG. 1 is a block diagram of a state-setting changing apparatus for a television receiver according to one embodiment of the present invention.
Figure 2:
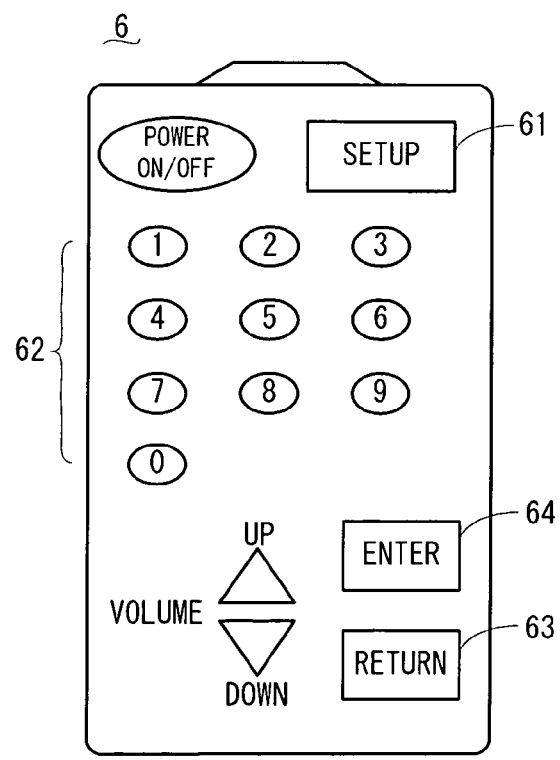
FIG. 2 is a front view of an example of a remote controller for use in the television receiver.

Referring now to the accompanying drawings, a state-setting changing apparatus for a wide-screen television receiver (STB) by means of a remote controller according to one embodiment of the present invention will be described. FIG. 1 shows a block configuration of the apparatus, FIG. 2 shows an example of a remote controller for use in the television receiver, and FIG. 3 shows how the display screen changes in the television receiver.

Currently, 16:9 aspect ratio high-definition television signals are transmitted besides conventional 4:3 aspect ratio signals. When high-definition television signals formatted with a 16:9 aspect ratio are received by a television receiver having a 4:3 aspect ratio display screen, a 16:9 aspect ratio picture is displayed at the central region of the display screen with blank areas where no image is displayed, which are called "letterboxes", at the top and bottom of the screen. Similarly, when standard television signals formatted with a 4:3 aspect ratio are received by a television receiver having a wide display screen with a 16:9 aspect ratio, a 4:3 aspect ratio picture is displayed at the central region of the display screen with blank areas where no image is displayed, which are called "sidebars", at the left and right of the screen.

The television receiver according to this embodiment that is described herein has a wide display screen with a 16:9 aspect ratio and has an aspect ratio converting function of, when receiving standard television signals with a 4:3 aspect ratio, stretching an image horizontally to display it on the full screen. Similarly, a television receiver may be used that has a 4:3 aspect ratio display screen and has an aspect ratio converting function of, when receiving 16:9 aspect ratio high-definition television signals, stretching an image vertically to display it on the full screen.

Referring to FIG. 1, the apparatus comprises an image analyzing circuit 1 to which image signals are input, an aspect ratio converting circuit 2, a display screen 3 such as a cathode lay tube or the like for displaying an image, a remote control signal analyzing microcomputer 4, a remote control signal receiving circuit 5, and a remote controller 6. The image analyzing circuit 1 analyzes input image signals to determine whether the signals are standard television signals with a 4:3 aspect ratio or high-definition television signals with a 16:9 aspect ratio, and outputs the analysis to the aspect ratio converting circuit 2. The aspect ratio converting circuit 2 converts the aspect ratio of the input image signals based on instructions received from the image analyzing circuit 1 or the remote control signal analyzing microcomputer 4 for output to the display screen 3. The display screen 3 is configured to display both 4:3 and 16:9 aspect ratio image signals.

As shown in FIG. 2, the remote controller 6 comprises a setup key 61 (specific key) for a viewer to direct an aspect ratio conversion for example. When a viewer presses the setup key 61, the remote control signal receiving circuit 5 receives signals transmitted from the remote controller 6 for output to the remote control signal analyzing microcomputer 4. When the remote control signal analyzing microcomputer 4 determines that the setup key 61 on the remote controller 6 is pressed to direct an aspect ratio conversion, it instructs the aspect ratio converting circuit 2 to convert an aspect ratio as directed by the viewer.

In response to an input signal from the remote controller 6, the apparatus is capable of not only switching a channel and adjusting the aspect ratio of the displayed picture but also switching a built-in clock between daylight saving time ON and OFF and switching an audio language. For example, when 4:3 aspect ratio signals are displayed on the 16:9 aspect ratio display screen 3 with sidebars as shown in FIG. 3A and the setup key 61 is pressed by a viewer (user) in this state, the remote control signal analyzing microcomputer 4 determines that the apparatus is placed into the setting change mode and thus displays by OSD (On Screen Display) only characters 31 of "SETUP" within the display screen 3 as shown in FIG. 3B. In this state, when digits "1" and "5" are entered by numeric keys 62 on the remote controller 6, the remote control signal analyzing microcomputer 4 provides an instruction to the aspect ratio converting circuit 2 and displays by OSD only characters with a number 32 of "SETUP 15" as shown in FIG. 3C. Thereafter, as shown in FIG. 3D, the 4:3 aspect ratio signals are displayed on the full screen of the 16:9 aspect ratio display screen 3 for preview. It is noted that the mode "SETUP 15" is assigned to the changing into full screen display of 4:3 aspect ratio (standard) signals on a 16:9 aspect ratio display screen. The user checks the display of the characters with the number 32 as well as the preview and, if appropriate, presses an enter key 64 to confirm the aspect ratio change. Otherwise, the user presses a return key 63 on the remote controller 6 and enters another code as appropriate by the numeric keys 62 again, thereby changing the display to another setting.

FIG. 4 shows a set of codes associated with various settings. This kind of list is shown in a manual so that a user can check the list to operate the apparatus until becoming accustomed to the operations. Since preview is provided, a user can, after being accustomed to the operations, enter a random code, check the preview, and repeats the operation as appropriate so as to make an intended setting change. It will be appreciated that such a list of codes and settings associated therewith as shown in FIG. 4 may be, for example, provided on a specification for the television receiver or stuck or marked on e.g. the back of the remote controller 6.

Figure 5:
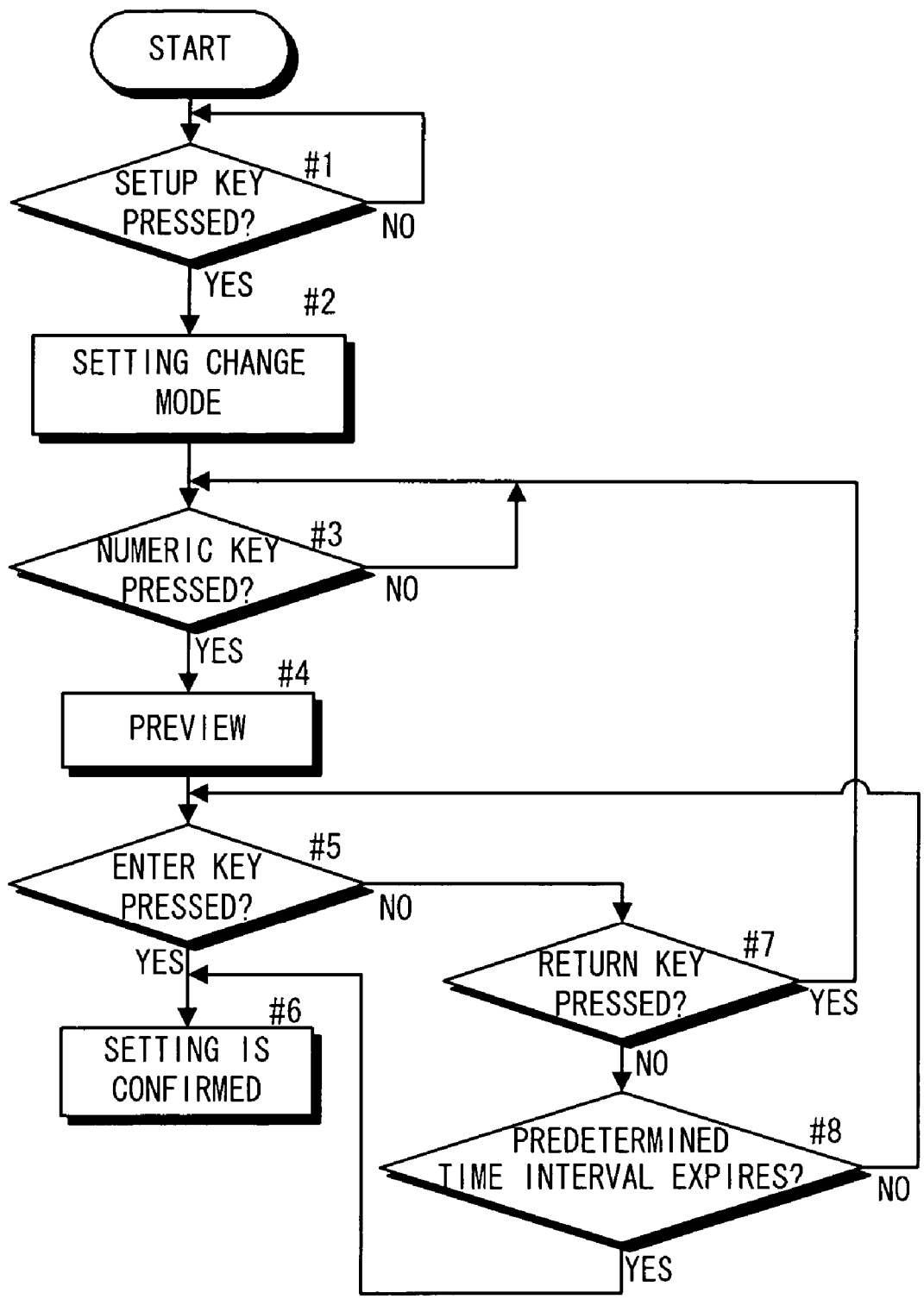
FIG. 5 is a flowchart showing a process executed by a remote control signal analyzing microcomputer according to the embodiment.

FIG. 5 is a flowchart showing a process executed by the remote control signal analyzing microcomputer 4 according to this embodiment. When the setup key 61 is pressed (#1), the apparatus enters the setting change mode (#2). Subsequently, when the numeric keys 62 are operated (#3), a preview is provided (#4). Then, if the enter key 64 is pressed (#5), the setting is confirmed (#6). If NO at the step #5 and the return key 63 is pressed (YES at #7), the process returns to the step #3. If NO at the step #7, the process returns to the step #5 until after the expiration of a predetermined time interval (NO at #8) and goes to a step #6 after the expiration (YES at #8). Thus, the above described operation is achieved.

As described above, according to the present invention, it is only characters with a number that are displayed within the display screen 3 when the setting change mode is selected, so that blocking of a displayed image can be minimized. Further, since an aspect ratio changed picture can be previewed, the aspect ratio setting for the display screen 3 can be changed without a display of a setup screen or a menu for setting changes on the display screen 3. Accordingly, setting of e.g. aspect ratio for the display screen 3 can be changed by simple operations without blocking an image being viewed.

Moreover, in the above embodiment, a certain aspect ratio provides blank areas such as sidebars or letterboxes on the screen. In such a case, by utilizing the areas to display a code entered in the setting change mode and a setting associated with the code in the form of an icon or the like, operations can be made easier.

Figure 6:
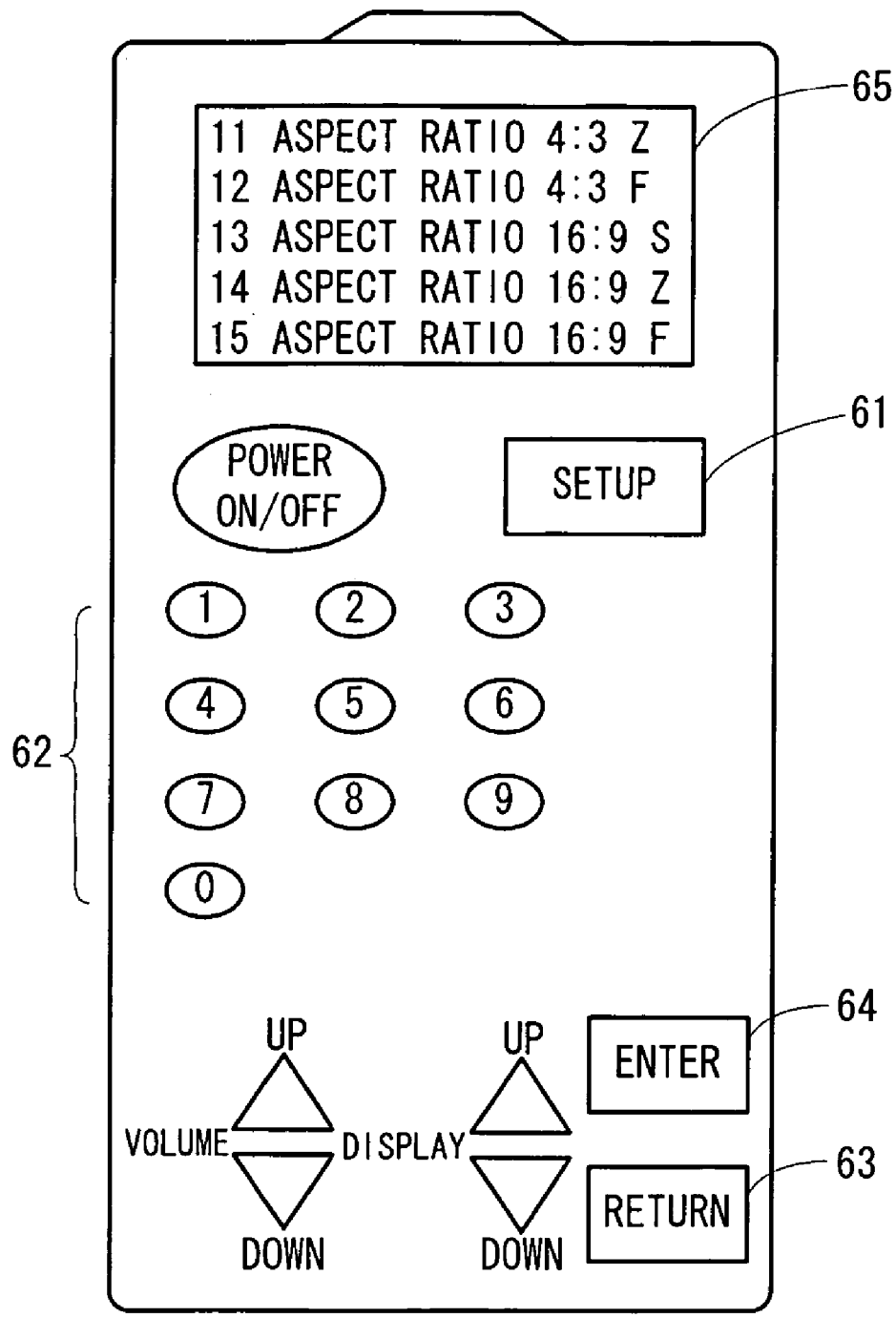
FIG. 6 is a front view of a remote controller according to another embodiment of the present invention.

FIG 6 shows a remote controller 60 according to another embodiment of the present invention. This remote controller 60 comprises a display 65 such as a liquid crystal display (LCD) or the like for display of codes and screen settings associated therewith. The remote controller 60 is configured such that a user can scroll data displayed on the display 65 by using operation keys. While checking the displayed data on the display 65, a user can enter a desired code by numeric keys 62. By such a configuration, setting change operations can be further facilitated.

The present invention has been described above using a presently preferred embodiment, but those skilled in the art will appreciate that various modifications are possible. Accordingly, all such modifications are intended to be included within the spirit and scope of the present invention. For example, in the above embodiment, it is designed that a user presses the setup key 61 to place the apparatus into the setting change mode, and thereafter presses the numeric keys for changing an aspect ratio to another one. However, it is also possible to design such that a user presses the setup key 61 again in place of the numeric keys to change an aspect ratio to a predetermined one. Then, if the preview is not a desired one, the user can press the setup key 61 repeatedly to check the settings one by one.

This application is based on Japanese patent application 2004-119803 filed in Japan dated Apr. 15, 2004, the contents of which are hereby incorporated by reference.

What is claimed is:

1. A state-setting changing apparatus for a television receiver that is capable of changing a state setting in response to operations of keys on a remote controller by a user, wherein the remote controller includes a setup key for a user to operate at least when making a state setting change, numeric keys assigned to predetermined state settings including aspect ratio setting, a return key for a user to return the state setting to a previous state setting, and an enter key for a user to confirm a command;

wherein the setup, numeric, return and enter keys are different physical keys; and wherein the television receiver allows an aspect ratio of a picture displayed on a display screen to be changed, and includes a receiving circuit for receiving signals transmitted from the remote controller, a command analyzing circuit for analyzing a command entered by a user based on contents and an order of received signals, an on-screen display circuit for displaying a number of a numeric key operated by a user on the display screen, and a state-setting changing circuit for changing a state setting based on an analysis provided by the command analyzing circuit when a user operates the enter key, wherein the numeric keys are also assigned to changing channels.

2. The state-setting changing apparatus according to claim 1, wherein when the setup key is operated, the on-screen display circuit further produces a predetermined character display indicating that the setup key is operated on the display screen.

3. The state-setting changing apparatus according to claim 1, wherein when an aspect ratio of the display screen is different from an aspect ratio of a displayed picture, the number of the numeric key is displayed at a blank area on the display screen.

4. The state-setting changing apparatus according to claim 1, wherein the remote controller further includes a display, which, when the setup key is operated, displays the state settings assigned to the numeric keys.

5. The state-setting changing apparatus according to claim 4, wherein when it is impossible to display all together the state settings assigned to all of the numeric keys on the display of the remote controller, a user can operate a cursor key on the remote controller to scroll the state settings assigned to the numeric keys for display.

6. The state-setting changing apparatus according to claim 1, wherein the contents of the received signals includes a signal corresponding to the setup key, a signal corresponding to at least one of the numeric keys and a signal corresponding to the enter key.

7. The state-setting changing apparatus according to claim 6, wherein the changed state is based on a state setting assigned to the at least one of the numeric keys.

8. The state-setting changing apparatus according to claim 1, wherein a plurality of state settings are assigned to a plurality of sequences of the numeric keys.

9. A system comprising:
a remote controller that includes
a setup key for a user to operate at least when making a state setting change,
numeric keys assigned to predetermined state settings including aspect ratio setting,
a return key for returning the state setting to a previous state setting, and
an enter key for a user to confirm a command wherein the setup, numeric, return and enter keys are different physical keys; and
a television receiver that allows an aspect ratio of a picture displayed on a display screen to be changed, and that includes
a receiving circuit that receives signals transmitted from the remote controller,
a command analyzing circuit that analyzes a command entered by a user based on contents and an order of received signals, wherein the received signals include at least a signal corresponding to the setup key, a signal corresponding to at least one of the numeric keys and a signal corresponding to the enter key,
an on-screen display circuit that displays a number of a numeric key operated by a user on the display screen, and
a state-setting changing circuit that changes a state setting based on an analysis provided by the command analyzing circuit in response to receipt of a signal corresponding to the enter key,
wherein the numeric keys are also assigned to changing channels.

10. The system of claim 9, wherein the received signals include signals corresponding to at least two of the numeric keys.

11. The system of claim 9, wherein when the setup key is operated, the on-screen display circuit further produces a predetermined character display indicating that the setup key is operated on the display screen.

12. The system of claim 9, wherein when an aspect ratio of the display screen is different from an aspect ratio of a displayed picture, the number of the numeric key is displayed at a blank area on the display screen.

13. The system of claim 9, wherein the remote controller further includes a display, which, when the setup key is operated, displays the state settings assigned to the numeric keys.

14. The system of claim 13, wherein when it is impossible to display all together the state settings assigned to all of the numeric keys on the display of the remote controller, a user can operate a cursor key on the remote controller to scroll the state settings assigned to the numeric keys for display.

15. A method of changing a state setting for a television receiver which allows an aspect ratio of a picture displayed on a display screen to be changed, the method comprising the acts of:
receiving, by a television receiver from a remote controller, a sequence of signals corresponding to a setup key for state setting change and at least one numeric key for predetermined state settings including aspect ratio setting;
determining a state corresponding to the at least one numeric key;
setting a state of the television receiver to the state corresponding to the at least one numeric key when a signal corresponding to an enter key is received, and
returning the state to a previous state when a signal corresponding to a return key is received, wherein the setup, at least one numeric, enter and return keys are different physical keys,
wherein the at least one numeric key is also assigned to changing channels.

16. The method of claim 15, wherein the sequence of signals include signals corresponding to at least two numeric keys.

17. The method of claim 15, further comprising the acts of:
providing a preview of the state corresponding to the at least one numeric key on a display screen prior to receipt of the signal corresponding to the enter key.

18. The method of claim 15, wherein when the setup key is operated, a predetermined character display is produced indicating that the setup key is operated on the display screen.

19. The method of claim 18, wherein when the signal corresponding to the at least one numeric key is received, an on-screen display circuit outputs only the predetermined character display, and the predetermined character display does not include a number corresponding to the at least one numeric key.

20. The method of claim 15, wherein when an aspect ratio of the display screen is different from an aspect ratio of a displayed picture, a number of the numeric key is displayed at a blank area on the display screen.

* * * * *

UNITED STATES PATENT AND TRADEMARK OFFICE
CERTIFICATE OF CORRECTION

PATENT NO. : 7,609,328 B2
APPLICATION NO. : 11/106477
DATED : October 27, 2009
INVENTOR(S) : Toshiya Iwahashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 580 days.

Signed and Sealed this

Fourteenth Day of December, 2010

David J. Kappos
*Director of the United States Patent and Trademark Office*